US008356676B2

United States Patent
Casals

(10) Patent No.: US 8,356,676 B2
(45) Date of Patent: Jan. 22, 2013

(54) DEVICE FOR EXTINGUISHING FIRES

(75) Inventor: Joan Saurina Casals, Olot (ES)

(73) Assignee: Inventec, S.L., Olot (Gerona) (ES)

( * ) Notice: Subject to any disclaimer, the term of this patent is extended or adjusted under 35 U.S.C. 154(b) by 143 days.

(21) Appl. No.: 13/123,542

(22) PCT Filed: Nov. 5, 2009

(86) PCT No.: PCT/ES2009/000527
§ 371 (c)(1),
(2), (4) Date: Apr. 11, 2011

(87) PCT Pub. No.: WO2010/052352
PCT Pub. Date: May 14, 2010

(65) Prior Publication Data
US 2011/0192617 A1 Aug. 11, 2011

(30) Foreign Application Priority Data
Nov. 10, 2008 (ES) .................................. 200803198

(51) Int. Cl.
*A62C 25/00* (2006.01)
*A62C 3/02* (2006.01)
(52) U.S. Cl. ........................................................ 169/53
(58) Field of Classification Search .................... 169/34, 169/46, 47, 51, 52, 53; 239/171; 244/136
See application file for complete search history.

(56) References Cited

U.S. PATENT DOCUMENTS

| 3,661,211 A * | 5/1972 | Powers | 169/53 |
| 3,710,868 A * | 1/1973 | Chadwick | 169/53 |
| 4,240,507 A * | 12/1980 | Hokkanen | 169/53 |
| 6,192,990 B1 * | 2/2001 | Brooke | 169/53 |
| 2002/0079379 A1 * | 6/2002 | Cheung | 239/171 |
| 2003/0146005 A1 * | 8/2003 | Brooke et al. | 169/53 |
| 2005/0087651 A1 * | 4/2005 | Powers et al. | 244/136 |
| 2006/0097112 A1 * | 5/2006 | Hall et al. | 244/136 |
| 2010/0018725 A1 * | 1/2010 | Ramos Rodriguez | 169/53 |

* cited by examiner

*Primary Examiner* — Darren W Gorman
(74) *Attorney, Agent, or Firm* — Notaro, Michalos & Zaccaria P.C.

(57) ABSTRACT

This device comprises a portable reservoir (2) suspended form a helicopter and provided with at least one lower hatch (21) for discharging the extinguishing liquid or water transported. The device comprises a vacuum pump (4) to create a vacuum inside said reservoir (2), a vacuum sensor (75) to regulate the vacuum created inside the reservoir (2) depending on the quantity of water to be loaded, several means to cause the opening of a lower hatch (21) of the reservoir (2) and the loading of water into the reservoir (2) as a result of the suction effect caused by the vacuum, several means for detecting when the reservoir (2) is full and several means for automatically closing the lower hatch (21) when the water load has reached a preset level.

5 Claims, 2 Drawing Sheets

DEVICE FOR EXTINGUISHING FIRES

OBJECT OF THE INVENTION

The present invention relates to a device for extinguishing fire of the type used for supplying water for fire-fighting work outside and suitable for being transported by helicopter.

BACKGROUND OF THE INVENTION

At present multiple devices intended for the transportation and use of water for extinguishing fires are known, which devices store a considerable amount of water and are transported by vehicles, both by land and air, to the fire area, usually an area exposed to the outside and of a certain extension, such as a forest fire, industrial facilities or a building of considerable size.

The use of a helicopter as a means of transport is a great advantage, as the helicopter moves fast between the water loading point and the discharge point into the fire, it can carry a significant amount of water, and it discharges accurately and can also load in tight spaces where seaplanes cannot land.

Some of the anti-fire and helicopter transported devices include a semi-rigid open top reservoir provided with slings or cables for its suspended fixation from a helicopter and a lower discharge hatch, which can be operated by the pilot. The loading of this reservoir can be made at any pond and pool but the loading speed depends on the pilot's skill to achieve immersion of the reservoir since the loading is performed through the top opening. Other disadvantages of these devices are: they require that the height of water in the loading area is higher than that of the reservoir as the loading is performed through its top, and that during transport part of the load may be lost as the reservoir is permanently opened at its top.

Other known devices include a rigid belly-tank, permanently installed on the bottom of the helicopter and equipped with a hydraulic pump and a hose for loading said tank, while the unloading is done through hatches or trapdoors at the bottom of the tank. The helicopter equipped with this device is more stable in flight and can reload in shallow areas. However, loading the water with the hydraulic pump is slow and the whole device is very heavy with respect to the water that it can carry.

In the patent RU 2197308 C2 an extinguishing fire apparatus from a helicopter is described comprising a loading tank connected to a vacuum pump which carried out a suction of air inside the tank during the water loading operation in order to facilitate the filling thereof.

The patent application WO 2008/071825A2 describes a helibucket for fire-fighting helicopters that has a flexible container provided with a filling pump equipped with level sensors for its automatic operation and stop when the helibucket touches the water, the unfolding of the helibucket and opening and closing of the loading hatches being performed by means of a system of cables.

This helibucket has maximum and minimum level sensors to control and amount of water that is loaded.

DESCRIPTION OF THE INVENTION

The device for extinguishing fires, object of this invention, has special technical features intended to allow a fast loading of the reservoir through its lower end and to provide faster and versatile performance of the transportation of water used to extinguish fires.

This device is of the type comprising a rigid reservoir with connections for coupling external hoses and fixing slings or cables to the bottom of a helicopter for the transportation of water or fire extinguisher liquids and their discharge by opening at least a lower hatch of the reservoir by control means operable from a control device, these control means being associated with pipes to the power connections of the helicopter's hydraulic system for driving the device, a vacuum pump arranged in a compartment of the helicopter and connected to the reservoir through a vacuum line, means to cause the opening of the lower hatch of the reservoir, means for detecting the filling of the reservoir comprising inner water level sensors connected to a control unit, and means for closing the lower hatch when said filling detection means indicate that the water loading has reached a pre-set level inside the reservoir.

According to the invention the reservoir comprises a vacuum sensor to regulate the vacuum created inside the reservoir by the vacuum pump when the reservoir is in the closed position and depending on the quantity of water to be loaded.

The means for opening a lower hatch comprise lower water sensors arranged outside, next to said lower hatch, and connected to a control unit that causes the opening of the lower hatch and the loading of water by the suction effect produced by the vacuum previously created inside the reservoir.

Thus, the helicopter pilot operates the vacuum pump while going to the loading place in order to remove the air inside the reservoir in advance, and when he/she reaches the loading place, this vacuum or depression causes the filling of the reservoir without needing water pumps in a few seconds upon opening the lower hatch and raising the sucked up water.

In addition, the device comprises means for detecting when the reservoir is full and means for automatically closing the lower hatch (21) when said filling detection means indicate that the water load has reached a pre-set level inside the reservoir.

Suction through the inner hatch, while the reservoir is slightly submerged below the surface of the water of the loading place, only requires a few centimeters in depth of said hatch to prevent entry of outside air. This load can be performed anywhere, whether a swimming pool, pond or river. By creating vacuum inside the reservoir, the loading of water is faster and easier than through the use of conventional water moving pumps, or by the application of a vacuum during the loading process, as the vacuum sucks in a short time (about 6 to 12 seconds for 1200 liters) the water that the reservoir is able to hold. Also the discharge is immediate, since once the reservoir is loaded; the lower hatch closes automatically, leaving the device suitable for allowing such discharge by operating this lower hatch.

The tank is of rigid constitution and includes a top sealing hatch allowing, after the loading, a better discharge of the water at the emptying place. The reservoir also has lower support elements that allow the support of the reservoir on a surface independently, the lower hatch being slightly higher with respect to the lower part of said support elements This reservoir can be made of composites, polyester, steel, carbon fibre, aluminium or other materials.

The vacuum pump is independent from the reservoir, preferably housable in a compartment of the helicopter, what facilitates its maintenance and the fact that several reservoirs can be connected to the same transporting helicopter with the vacuum pump staying in the helicopter.

Once the device loaded, the pilot should only decide whether to make a very fast, fast, medium, slow, etc. discharge, depending on the instructions he/she receives.

In order to make the water loading operation as automatic and simple as possible for the pilot it is provided that the control means, causing the opening of the lower hatch and the loading of water, include lower water sensors that determine the time of filling.

In turn, the means to detect the reservoir filling comprise sensors of the inside level of water connected to a control unit for the water loading operation. Once these inner water level sensors detect that the reservoir has been filled, the control unit warns the pilot accordingly by means or acoustic and/or light warnings at the cockpit controls and the lower hatch closes to prevent loss of water. Then the upper hatch opens to allow the discharge when arriving at the spot where the reservoir will be emptied.

The reservoir can take different shapes, but it is mainly spherical or cylindrical shaped with curved bases, as these are the structures which gives the best response to the inside vacuum when proceeding to the water loading. In these cases, the support elements comprise two parallel rigid rings connected by support legs, the upper ring being arranged above the middle of the reservoir and the lower support ring being larger.

The lower and/or upper hatches are of the butterfly type, driven by a respective hydraulic cylinder by means of the power connections with the helicopter. However, it is possible that at least the upper hatch can be otherwise.

As mentioned above, the device reservoir can be placed on a solid surface, such as ground, allowing it to be used for water supply in an area more or less close to the fire. Additionally the reservoir comprises connections for water supply to tankers, hoses and other fire extinguishing equipment, either by hydraulic pumps or simply by gravity.

One of the objects of the invention is to allow the device to be quickly fitted or removed from the helicopter, preferably in less time than half a minute, comprising quick coupling means of the reservoir to the helicopter for this purpose. In one embodiment of the invention, these means are configured by a plate arranged on the bottom of the helicopter and equipped with vacuum connections of hydraulic pressure and power supply and another plate combined with means of quick anchoring to the helicopter plate, with the reservoir fixing slings and connections being attached to said second plate, complementary to the first plate and connected to the vacuum pipe of the reservoir, to the hydraulic pressure pipes driving the reservoir devices and to the electric connections of the control unit and the control means.

DESCRIPTION OF FIGURES

In order to complement the description that is being carried out and with the purpose of facilitating the understanding of the characteristics of the invention, the present description is accompanied by a set of drawings wherein, by way of a non-limiting example, the following has been represented.

PREFERRED EMBODIMENT OF THE INVENTION

Figure 1:
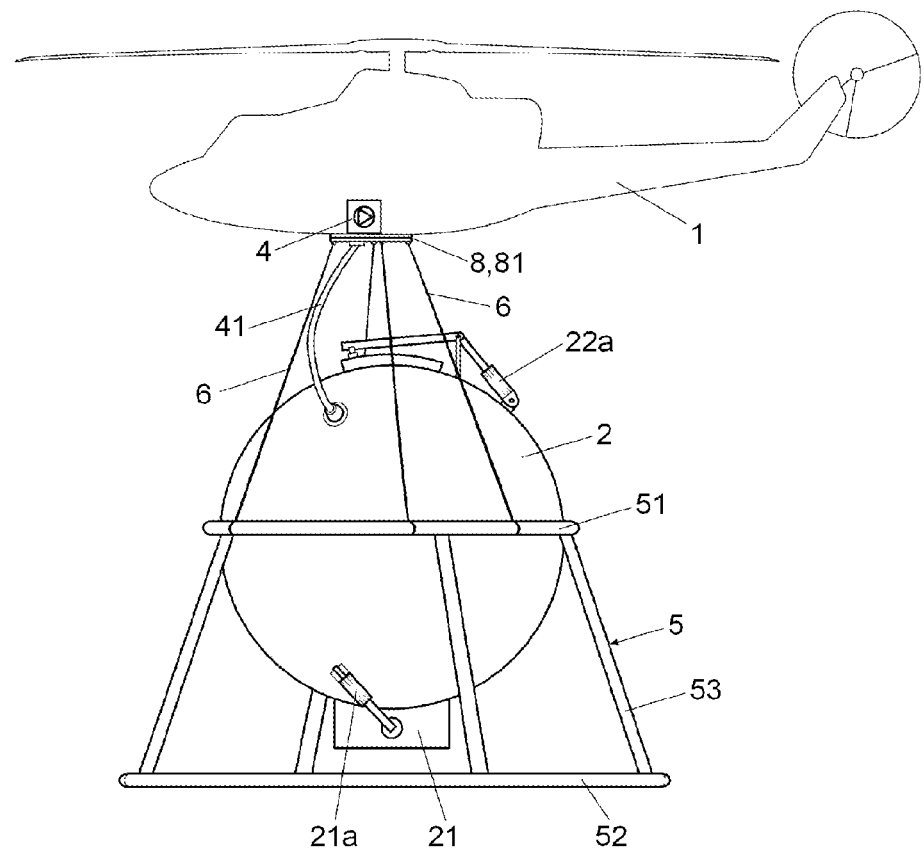
FIG. 1 shows an elevation view of one embodiment of the device for extinguishing fires attached to a helicopter.
Figure 2:
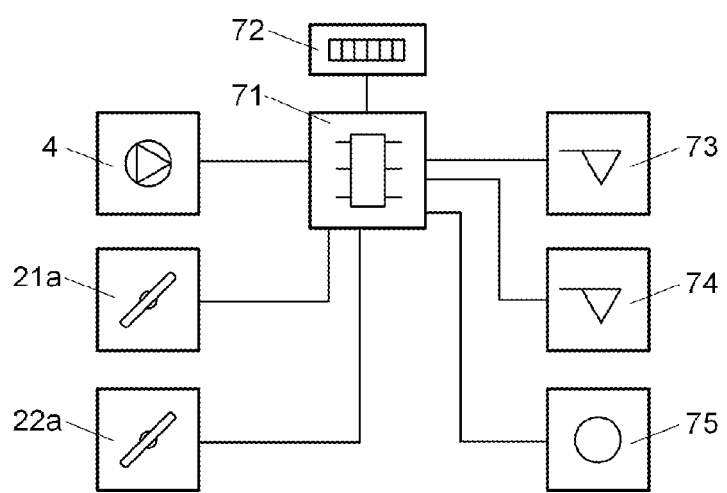
FIG. 2 shows a block diagram of the control means of the device.

As can be seen in the referenced figures, the device for extinguishing fires can be coupled on the bottom of a helicopter (1) for its operation and transportation of water from the loading areas to the point where its use is necessary.

Thus, the device comprises a reservoir (2) of rigid and watertight constitution, in this case spherical shaped and made of plastic, which has a lower hatch (21) of butterfly type and a sealing articulated upper hatch (22), both hatches being driven by hydraulic cylinders (21a and 22a) connected by pipes (3) to the hydraulic power connections of the helicopter (1). The device comprises a vacuum pump (4), housed in the helicopter (1) and connected by a vacuum pipe (41) to the reservoir (2).

The reservoir (2) presents at its bottom supporting elements (5) that define a support such that the lower hatch (21) is just a few centimeters above the surface on which it rests, these supporting elements (5) being made up of two parallel rigid rings (51 and 52) joined by legs (53), the first upper ring (51) is arranged around the middle of the spherical reservoir (2) and from which the legs (53) extend downwards diverging to the lower ring (52), which has a larger diameter to allow better stability of the reservoir (2) resting on the ground.

In the upper ring (51) are fixed slings (6) for fixing to the bottom of the helicopter (1), what allows the transportation of the suspended reservoir.

The device has means for its operational control that are set by a control unit (71) for the automatic working of certain operations, with said control unit (71) being associated to actioning controls (72) at the cockpit and water lower sensors (73) next to the lower hatch (21) and inside water level sensors (74) in the reservoir (2) to check the load. The control means also comprise a vacuum sensor (75) inside the reservoir (2).

Figure 4:
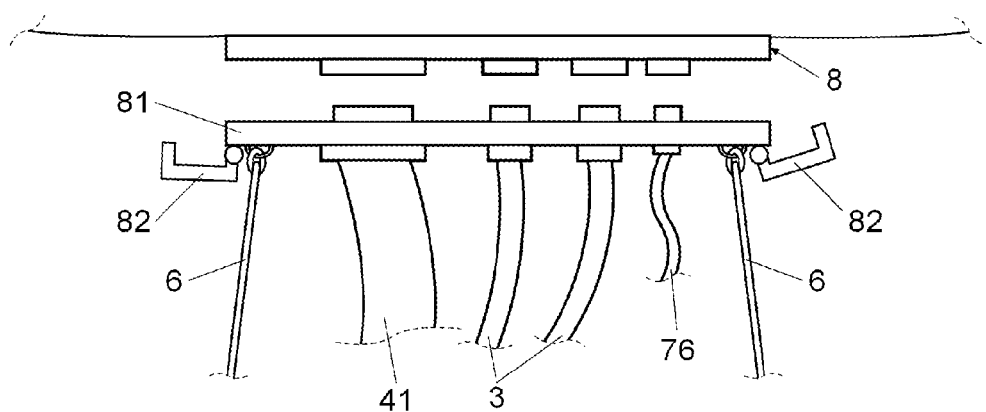
FIG. 4 shows a detail of a schematic embodiment of the coupling means.

FIG. 4 shows a detail of a quick coupling means for attaching the device to the helicopter (1), said quick coupling means being configured by a plate (8) fixed at the bottom of the helicopter (1) and another combined plate (81), which in this case has a few direct coupling hooks (82) on the sides, with the corresponding connections of the fixing slings (6), the vacuum pipe (41) between the vacuum pump (4) and the reservoir (2), the pipes (3) with hydraulic power connections and electric connections (76) of the sensors (73, 74 and 75) from inside the helicopter (1) being associated with said plate (81).

Figure 3:
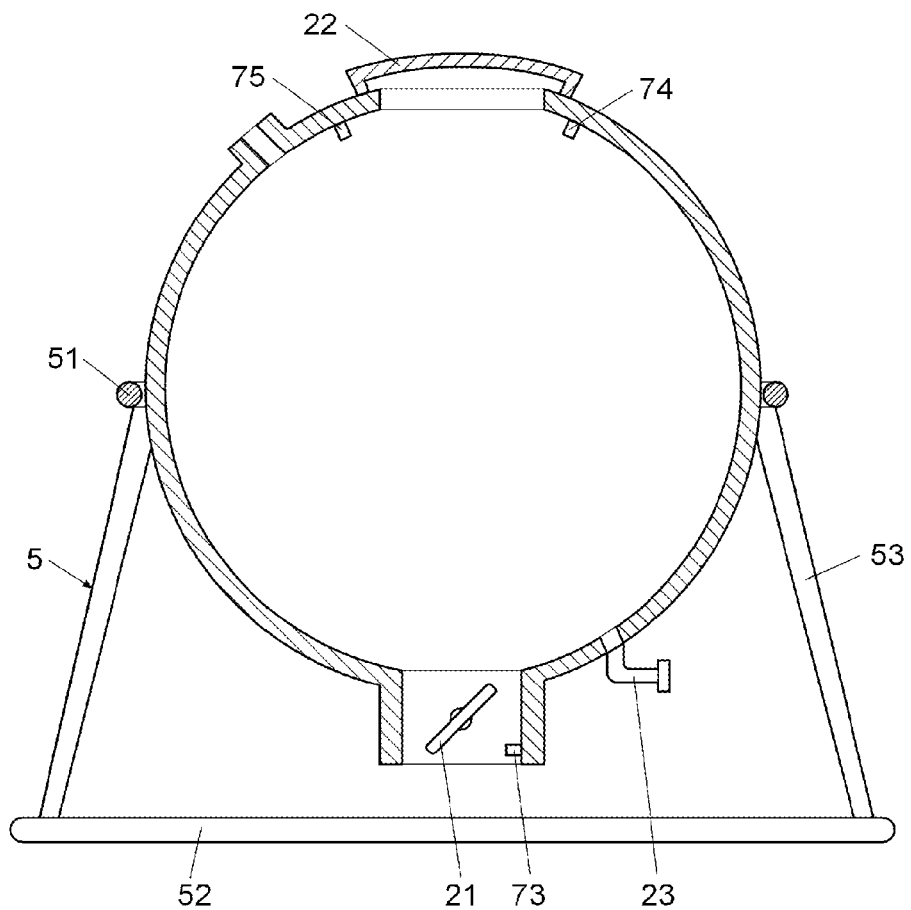
FIG. 3 shows an elevation view of the section of the reservoir and inside components.

FIG. 3 shows the reservoir (2) having at its bottom connections (23) for coupling hoses.

Once the nature of the invention as well as an example of preferred embodiment have been sufficiently described, it is stated for all pertinent purposes that the materials, form, size and arrangement of the elements described are susceptible to changes, provided these do not involve an alteration of the essential characteristics of the invention that are claimed subsequently.

The invention claimed is:

1. A device attached to a helicopter for extinguishing fires, comprising:
   a rigid reservoir (2) for containing water, the reservoir (2) including at least one connection (23) for coupling to at least one external hose;
   fixing slings (6) connected to the reservoir (2) and to a bottom portion of the helicopter for facilitating transportation of the reservoir (2);
   a lower hatch (21) located on a lower portion of the reservoir (2);
   hydraulic pipes (3) connected to power connections of a hydraulic system of the helicopter;
   a control unit (71) operably connected to a control device (72), wherein the control unit (71) controls hydraulic pressure within the hydraulic pipes (3);

a vacuum pump (4) arranged in a compartment of the helicopter;

a vacuum line (41) connected between the reservoir (2) and the vacuum pump (4);

means for causing opening of the lower hatch (21) to thereby facilitate filling of the reservoir (2);

means for detecting a pre-set water level within the reservoir (2), comprising at least one inner water level sensor (74) electrically connected to the control unit (71), wherein the lower hatch (21) will automatically close when a water level of the reservoir (2) has reached the pre-set water level;

a vacuum sensor (75) within the reservoir (2) electrically connected to the control unit (71) so as to provide information for regulating a vacuum created inside the reservoir (2) by the vacuum pump (4) when the reservoir (2) is in a closed position and depending on a predetermined quantity of water to be loaded;

wherein the means for causing opening of the lower hatch (21) comprises at least one lower water sensor (73) electrically connected to the control unit (71) and arranged outside of an interior of the reservoir (2) adjacent to the lower hatch (21) for detecting the presence of water to be loaded; whereby water is loaded into the reservoir (2) through the lower hatch (21) by a suction effect produced by the vacuum pump (4) previously created inside the reservoir (2) when the lower hatch (21) is opened.

2. The device according to claim 1, wherein the reservoir (2) comprises a sealing upper hatch (22), and support elements (5) that allow the reservoir (2) to be supported independently on a surface, and wherein the lower hatch (21) is arranged slightly higher with respect to a lowest part of the support elements (5).

3. The device according to claim 2, wherein the support elements (5) comprise two parallel rigid rings (51, 52) connected by support legs (53), and wherein one of the two rings is an upper support ring (51) arranged above a midline of the reservoir (2) and the other of the two rings is a lower support ring (52) which is larger than the upper support ring and defines the lowest part of the support elements (5).

4. The device according to claim 2, wherein the lower and upper hatches (21, 22) are butterfly-type hatches and are each associated with a respective hydraulic cylinder (21*a*, 22*a*), and wherein the hydraulic cylinders (21*a*, 22*a*) are operatively connected to the hydraulic pipes (3).

5. The device according to claim 1, further comprising quick coupling means for coupling the reservoir (2) to the helicopter, wherein the quick coupling means consists of a plate (8) fixed to the helicopter and a combined plate (81) having anchoring means (82), wherein the fixing slings (6), a connection of the vacuum line (41) between the reservoir (2) and the vacuum pump (4), the hydraulic pipes (3), and electric connections (76) for the sensors (73, 74, 75) are fixed to the combined plate (81).

* * * * *